(12) United States Patent
Tsuchiya

(10) Patent No.: US 7,424,926 B2
(45) Date of Patent: Sep. 16, 2008

(54) VEHICULAR BATTERY MOUNTING STRUCTURE

(75) Inventor: Takenori Tsuchiya, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/542,051

(22) PCT Filed: Feb. 3, 2004

(86) PCT No.: PCT/IB2004/000248

§ 371 (c)(1),
(2), (4) Date: Jul. 13, 2005

(87) PCT Pub. No.: WO2004/070860

PCT Pub. Date: Aug. 19, 2004

(65) Prior Publication Data

US 2006/0096797 A1     May 11, 2006

(51) Int. Cl.
*B60K 11/00* (2006.01)
*B60K 1/00* (2006.01)
*B60R 16/04* (2006.01)

(52) U.S. Cl. .............. 180/68.5; 180/68.1; 180/68.2; 180/65.1; 429/99

(58) Field of Classification Search ............... 180/68.5, 180/68.1, 68.2, 65.1; 429/99
See application file for complete search history.

(56) References Cited

U.S. PATENT DOCUMENTS

| | | | |
|---|---|---|---|
| 5,501,289 A | | 3/1996 | Nishikawa et al. |
| 5,555,950 A | | 9/1996 | Harada et al. |
| 5,836,412 A | * | 11/1998 | Lyles et al. ............... 180/65.1 |
| 5,918,692 A | * | 7/1999 | Sekita et al. ............... 180/56 |
| 5,948,298 A | * | 9/1999 | Ijaz ............................ 219/209 |
| 6,188,574 B1 | * | 2/2001 | Anazawa .................... 361/695 |

(Continued)

FOREIGN PATENT DOCUMENTS

JP     A 2000-40535     2/2000

(Continued)

OTHER PUBLICATIONS

Miyamoto, et al.: Advanced Battery System For Electric Vehicle (FEV-II), Japan Electric Vehicle Association (JEVA), Oct. 13, 1996, vol. 1, Symposium 13, pp. 37-44.

(Continued)

*Primary Examiner*—Christopher Ellis
*Assistant Examiner*—John R Olszewski
(74) *Attorney, Agent, or Firm*—Kenyon & Kenyon LLP

(57) ABSTRACT

A vehicular battery mounting structure for mounting a battery pack above a floor panel while securing a simple structure of cooling passageways. This battery mounting structure is suitably adopted in a vehicle that is equipped with a first battery pack and a second battery pack that has stricter requirements regarding the temperature of the service environment. The first battery pack is mounted in an engine compartment. The second battery pack is disposed below a seat that is mounted on a floor panel as a seat for a vehicle occupant other than a driver. Specifically, a plurality of battery cells of the second battery pack are stacked in the longitudinal direction relative to the vehicle. Cooling passageways are provided between the battery cells, and conduct air supplied by a sirocco fan from a center side to an outer side in the direction of width of the vehicle.

7 Claims, 7 Drawing Sheets

U.S. PATENT DOCUMENTS

| | | | | |
|---|---|---|---|---|
| 6,227,322 | B1 * | 5/2001 | Nishikawa | 180/68.5 |
| 6,264,260 | B1 * | 7/2001 | Kronner et al. | 296/37.15 |
| 6,598,691 | B2 * | 7/2003 | Mita et al. | 180/65.1 |
| 6,632,560 | B1 * | 10/2003 | Zhou et al. | 429/99 |
| 6,662,891 | B2 * | 12/2003 | Misu et al. | 180/68.1 |
| 6,798,658 | B2 * | 9/2004 | Takedomi et al. | 361/694 |
| 6,978,855 | B2 * | 12/2005 | Kubota et al. | 180/65.3 |
| 6,988,575 | B2 * | 1/2006 | Takedomi et al. | 180/68.5 |
| 7,000,716 | B2 * | 2/2006 | Leifert | 180/65.1 |
| 2004/0115486 | A1 | 6/2004 | Takeshita et al. | |

FOREIGN PATENT DOCUMENTS

| | | |
|---|---|---|
| JP | 2000-233648 | 8/2000 |
| JP | 2001-126685 A | 5/2001 |
| JP | 2001-138753 A | 5/2001 |
| JP | 2002-134084 A | 5/2002 |

OTHER PUBLICATIONS

Electrique, Hybrides, Piles a Combustible: Le Catalogue General Motors, Engenieurs De L'Automobile, Raip. Boulogne, FR, No. 720, Apr. 1, 1998, pp. 38-39.

Korean Office Action dated Oct. 19, 2006 with English translation.

Japanese Language Version of Japanese Office Action, Appln. No. JP2003-027183, issued Jan. 9, 2007.

English Translation of Japanese Office Action, Appln. No. JP2003-027183, issued Jan. 9, 2007.

* cited by examiner

VEHICULAR BATTERY MOUNTING STRUCTURE

This is a 371 national phase application of PCT/IB2004/000248 filled 03 Feb. 2004, claiming priority to Japanese Application No. 2003-027183 filed 04 Feb. 2003, the contents of which are incorporated herein by reference.

BACKGROUND OF THE INVENTION

1. Field of the Invention

The invention relates to a mounting structure for an electric appliance mounted in a vehicle and, more particularly, to a vehicular battery mounting structure in which a battery pack is mounted on a floor panel of a vehicle.

2. Description of the Related Art

In order to achieve improved fuel economy and clean exhaust gas, the development of vehicles having new driving mechanisms, such as electric vehicles, hybrid vehicles, etc., has been pursued. Such vehicles need to be equipped with electric appliances that are not provided in the vehicles that have an internal combustion engine as a sole vehicle driving power source. Examples of such electric appliances include a traction motor of an electric vehicle or a hybrid vehicle, a secondary battery that supplies power to a starter to restart an engine in conjunction with an idling stop system for stopping the engine at the time of an idling condition, etc. The mounting position of such an electric appliance needs to be determined in view of effective utilization of the cabin space and the trunk space of the vehicle, safety securement at the time of a collision accident, etc.

Japanese Patent Application Laid-Open Publication No. 2000-233648 discloses a vehicle in which a battery is mounted on a floor panel in a cabin. The vehicle disclosed therein is a vehicle in which a battery (battery pack) is mounted above the floor panel and, more specifically, the battery is disposed within a space surrounded by a closed-section member that is disposed on the floor panel. This battery has a cooling structure in which an air introduction means for introducing air is connected to the closed-section member, and an air outlet is formed at a location in the closed-section member which corresponds to the battery. Furthermore, this battery is divided into a driver seat-side section and a passenger seat-side section which are mounted below the driver seat and the passenger seat, respectively.

According to the above-described battery mounting structure, the closed-section member provided on the floor panel can be effectively used as a ventilating and cooling duct. Therefore, the structure does not need new provision of a duct or the like, and allows the ventilation and cooling of the battery disposed in the cabin without degrading the ease of layout in the cabin.

However, the foregoing battery mounting structure has problems as stated below. That is, a battery (battery pack) mounted has a structure that is formed by stacking a plurality of battery cells in the direction of a width of the vehicle. Cooling passageways are provided between battery cells, and conduct cooling air from top to bottom or from bottom to top. In order to uniformly introduce cooling air into the cooling passages, a chamber is needed. The chamber is provided above or below the battery cells. Therefore, the height of the battery pack is becomes great. However, the under-seat space has severe restrictions on the dimension in the vertical direction. Therefore, the containment of a battery within the under-seat space is not easy. Furthermore, since the inlet and outlet ducts for the battery are formed by using a vehicle body member, the structure becomes complicated.

SUMMARY OF INVENTION

The invention has been accomplished in order to solve the aforementioned problems, and provides a vehicular battery mounting structure for mounting a battery pack between a floor panel and a seat while securing a simple structure of cooling passageways.

In a mounting structure provided as one aspect of the invention, a battery pack having a plurality of battery unit cells or battery modules in accordance with a performance of a vehicle is disposed between a floor panel of the vehicle and a seat disposed above the floor panel, and the plurality of battery unit cells or battery modules are stacked in a longitudinal direction relative to the vehicle.

According to this mounting structure, since the battery cells or the battery modules are stacked in the longitudinal direction relative to the vehicle, the cooling medium can be caused to flow, for example, from a center side to an outward side in the direction of width of the vehicle. This structure eliminates the need for provision of a chamber in an upper or lower portion of a battery pack, and therefore allows a reduction in the height of the battery pack in the vertical direction. Therefore, the battery pack can be mounted easily even if there are severe restrictions regarding the vertical dimensions of an installation space as in the case of an under-seat space.

It is preferable that the seat be a seat that does not have a power seat function. In this preferable structure, no electrical equipment component part for realizing a power seat function is provided in the space under or below the seat in which the battery pack is disposed, so that the mountability of the battery pack improves.

Furthermore, it is preferable that the seat be a passenger seat or a rear seat. Therefore, the battery pack is disposed under or below a rear seat or a passenger seat, that is, a seat that is less often equipped with a power seat function. Since no electrical equipment component part for realizing a power seat function is provided in the space under or below the passenger or rear seat in which the battery pack is disposed, the mountability of the battery pack improves. Furthermore, since the steering wheel is not present forward of passenger and rear seats, the passenger and rear seats can be easily moved, and are therefore advantageous for easy maintenance of the battery pack.

It is also preferable that the battery pack comprise a battery body formed by the plurality of battery unit cells or battery modules, and a space portion that is adjacent to the battery body and that is provided at a side of the battery body that faces a center line of a width of the vehicle. The space portion serves as a chamber for conveyance of a battery-cooling medium from the side facing the center line of the width of the vehicle to the side opposite from the center line-side. Therefore, the plurality of battery cells can be uniformly cooled without the need to provide a dedicated chamber space.

Furthermore, the battery pack may further comprise a cooling fan, and the cooling fan may be provided at a side of the battery body opposite from the side that faces the center line of the width of the vehicle, and the cooling fan may supply a cooling medium between the battery unit cells, or between the battery modules.

The cooling fan may supply the cooling medium from the side that faces the center line of the width of the vehicle to the side opposite from the side that faces the center line of the width of the vehicle.

Furthermore, the cooling fan may supply the cooling medium from the side that faces the center line of the width of the vehicle to the side opposite from the side that faces the center line of the width of the vehicle, and may discharge the cooling medium into a cabin. This structure makes it possible to cool the battery pack by circulating temperature-controlled air from the cabin through the battery pack via the cooling fan.

The battery pack may further comprise diffusion means for diffusing the cooling medium discharged from the cooling fan into the cabin; Therefore, the cooling air discharged into the cabin is diffused by the diffusion means, so that the cooling air does not directly strike an occupant, and therefore does not disturb the occupant.

The diffusion means may include a plurality of outlets.

It is also possible that a suction direction of the cooling fan be a direction of a rotating axis of the cooling fan, and a discharge direction of the cooling fan be a circumferential direction relative to the cooling fan. Since the cooling fan with its suction direction being along the rotating axis and its discharge direction being circumferential, the cooling fan has a reduced dimension in the direction of the width of the vehicle, and can easily be incorporated into the battery pack. Therefore, a compact battery pack can be realized.

The cooling fan may be a sirocco fan. Since a sirocco fan is compact in size and able to generate great pressure, the employment thereof will achieve efficient conveyance of the cooling air even if the cooling passageways have a complicated configuration and therefore cause great pressure loss.

Furthermore, the battery pack may be formed by a lithium ion battery or a nickel metal hydride battery. Therefore, a battery pack formed by a lithium ion battery or a nickel metal hydride battery is disposed within the cabin, with an excellent temperature condition, while a simple structure of cooling passageways is secured.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

In the following description, the present invention will be described in more detail in terms of exemplary embodiments.

Figure 1:
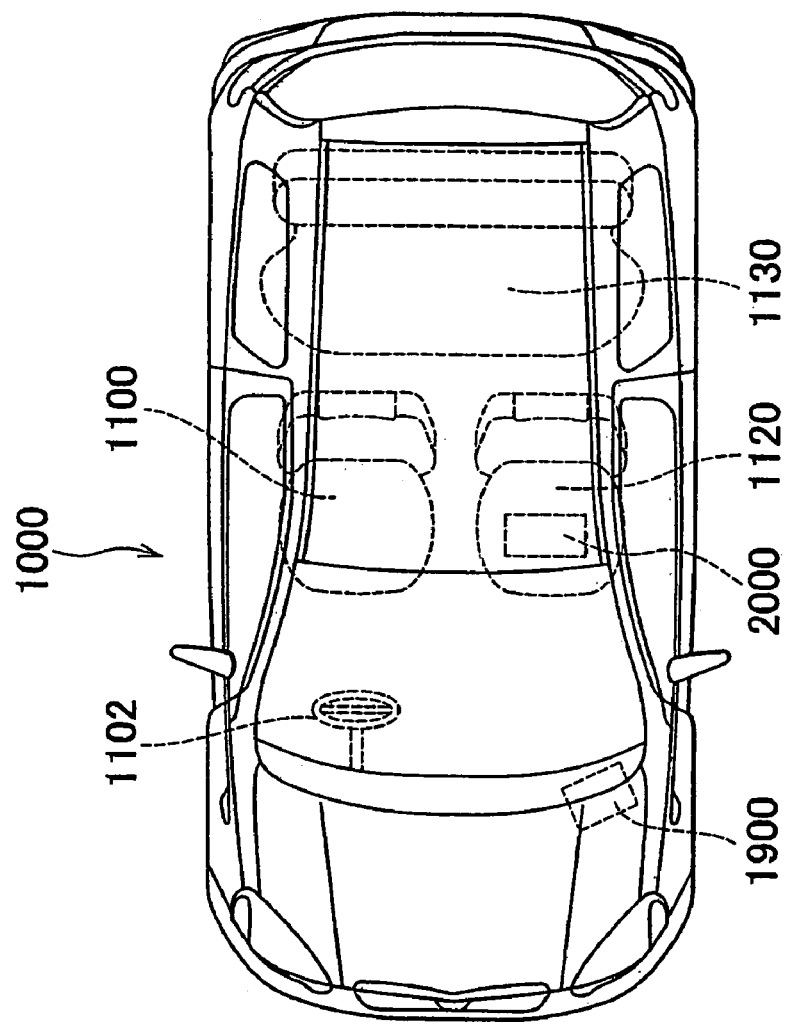
FIG. 1 is a top plan view of a vehicle in which a mounting structure in accordance with an embodiment of the invention is adopted to mount a battery pack.
Figure 2:
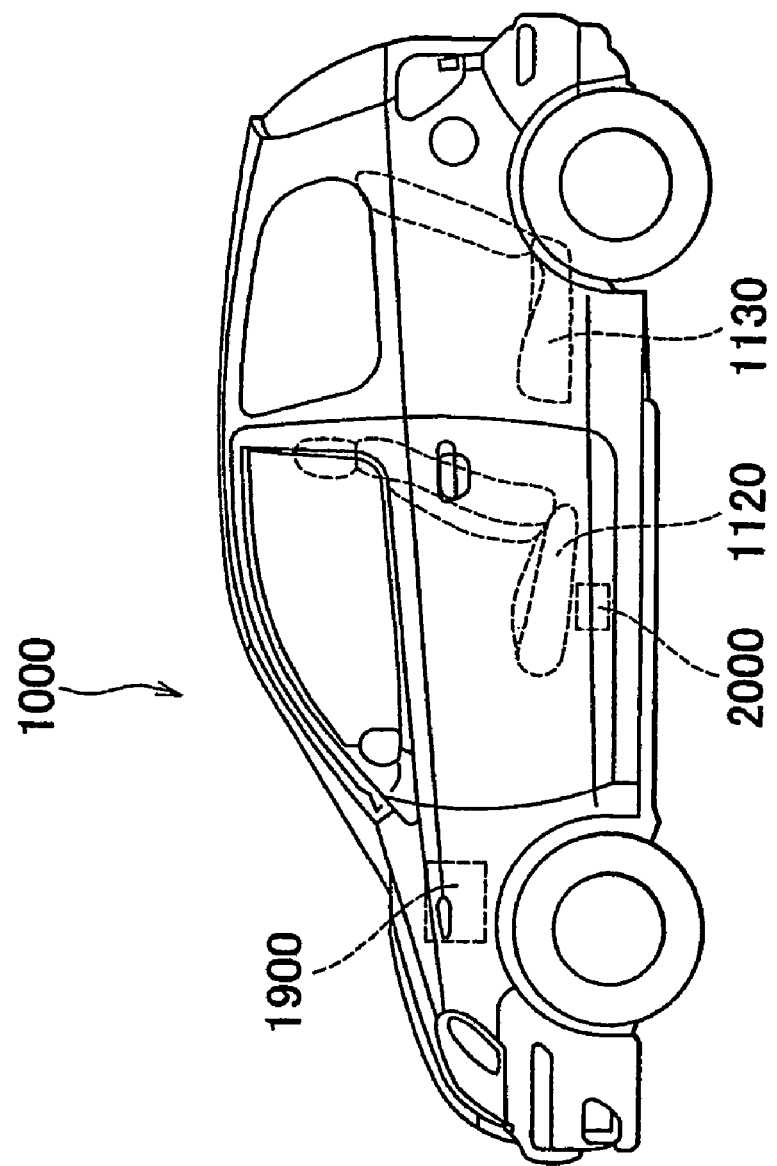
FIG. 2 is a side view of the vehicle in which the mounting structure in accordance with the embodiment of the invention is adopted to mount a battery pack.

With reference to FIGS. 1 and 2, a vehicle 1000 in which a battery pack is mounted through the use of a battery pack mounting structure in accordance with the invention will be described. FIG. 1 shows a top plan view of the vehicle 1000. FIG. 2 shows a side view of the vehicle 1000.

The vehicle 1000 has an automatic transmission. Furthermore, the vehicle 1000 incorporates an idling stop system (also termed "stop-and-go system") that automatically stops the engine if a driver depresses a brake pedal after the vehicle has stopped at the red light at an intersection or the like, and that automatically restarts the engine when the driver discontinues depressing the brake pedal and depresses an accelerator pedal. During the idling stop of such a vehicle, no power is supplied from the engine for operating an oil pump of the automatic transmission (e.g., a CVT (continuously variable transmission)), or for operating accessories, such as an air-conditioner compressor or the like. In order to operate accessories, such as the CVT oil pump, the air-conditioner compressor, etc., during the idling stop, electric power is supplied from a second battery pack 2000, that is, a lithium ion battery. This battery pack 2000 is also used to supply electric power to the starter in order to restart the engine at the time of return from the idling stop.

Besides the second battery pack 2000, the vehicle 1000 has a first battery pack 1900 that is formed by a 12-volt lead storage battery. The first battery pack 1900 is disposed within an engine compartment.

As shown in FIGS. 1 and 2, the second battery pack 2000 is disposed under a passenger seat 1120 of the vehicle 1000. The passenger seat 1120 herein refers to a foremost-row seat that is other than a seat 1100 that directly faces a steering wheel 1102 of the vehicle. The battery pack mounting structure in accordance with the embodiment of the invention is not limited to a structure for mounting the second battery pack 2000 under the passenger seat 1120. For example, a structure for mounting the second battery pack 2000 under a rear seat 1130 is also possible. It is assumed herein that neither the passenger seat 1120 nor the rear seat 1130 of the vehicle 1000 has a power seat function.

The lead storage battery that forms the first battery pack 1900 is disposed within the engine compartment. The lead storage battery repeatedly undergoes charging and discharging in a high SOC (state of charge) region. The lithium ion battery, forming the second battery pack 2000, has high operating voltage, and has high energy density per weight and volume. Therefore, reductions in weight and volume have been achieved. Furthermore, the lithium ion battery can be repeatedly charged and discharged since the lithium ion battery is free of the memory effect.

In addition to the aforementioned properties, the lithium ion battery has a wide SOC range for charging and discharging. Therefore, the lithium ion battery can be deeply charged and discharged, and therefore is able to favorably supply power to the CVT oil pump and accessories (the air-conditioner compressor and the like) during an idling stop.

The batteries suitable for adoption of the battery pack mounting structure in accordance with the embodiment of the invention are not limited to lithium ion batteries. For example, a nickel metal hydride battery or the like is also possible. The adoption of the battery pack mounting structure in accordance with the embodiment of the invention is preferable for batteries that have stricter temperature requirements for use than the lead storage battery. However, the battery pack mounting structure in accordance with the embodiment of the invention may be adopted for mounting the lead storage battery.

Figure 3:
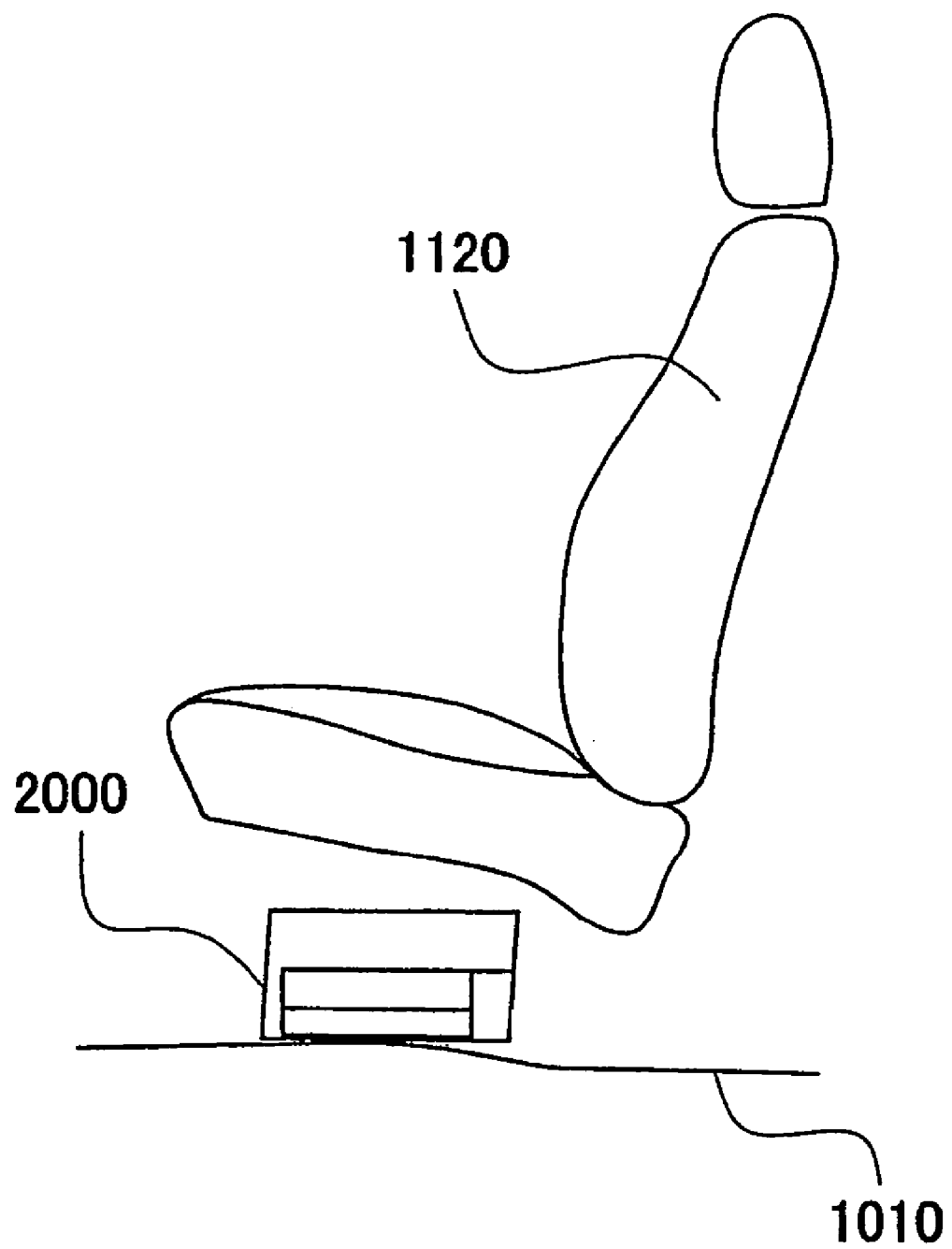
FIG. 3 is a detailed and partial side view of the vehicle in which the mounting structure in accordance with the embodiment of the invention is adopted to mount a battery pack.
Figure 4:
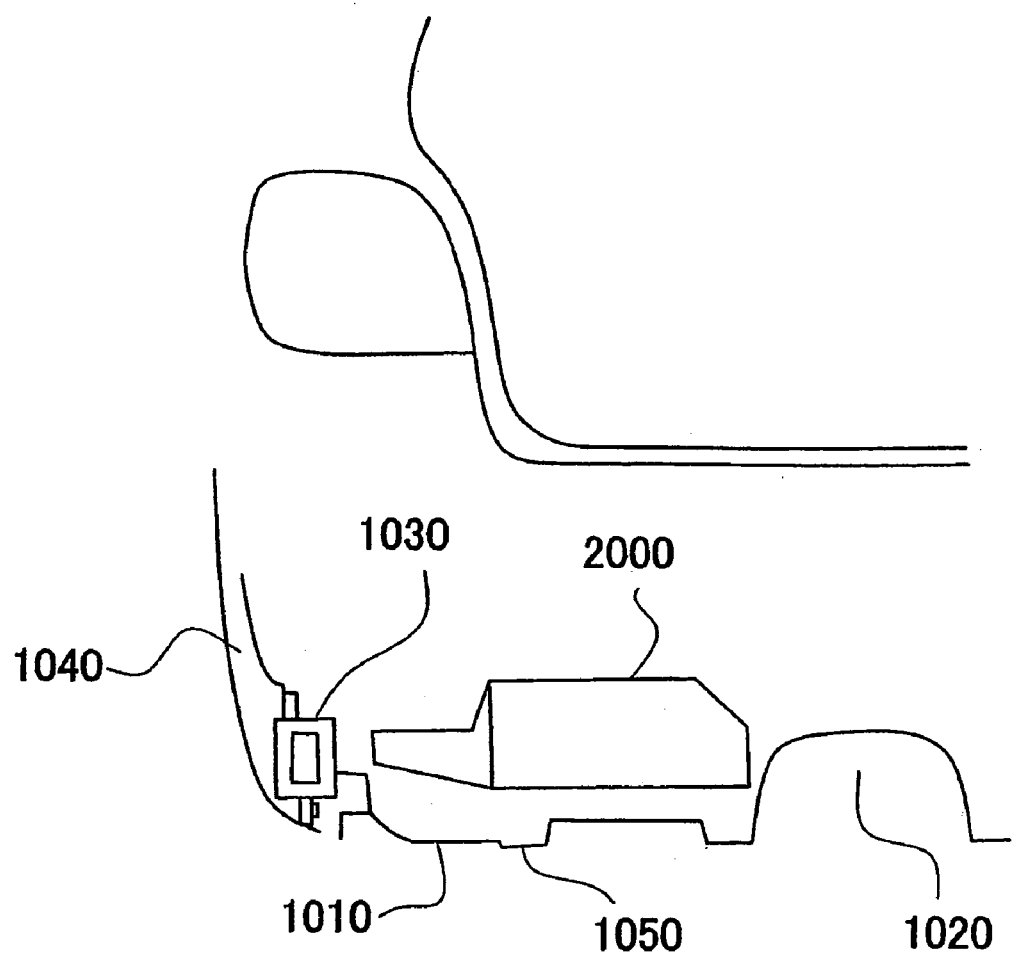
FIG. 4 is a partial rear view of the vehicle in which the mounting structure in accordance with the embodiment of the invention is adopted to mount a battery pack.

With reference to FIGS. 3 and 4, the battery pack mounting structure in accordance with the embodiment of the invention will be further described in detail.

FIG. 3 shows a side view of the passenger seat 1120 and its vicinity where the battery pack 2000 is disposed. FIG. 4 is a rear view of the passenger seat 1120 and its vicinity where the battery pack 2000 is disposed.

As shown in FIGS. 3 and 4, the battery pack 2000 is disposed below the passenger seat 1120 and above a floor panel 1010. The floor panel 1010 has a substantially horizontal configuration. As shown in FIG. 4, a rocker panel 1030, that is, a vehicle side frame member, is disposed outward of the battery pack 2000 in the direction of vehicle width. A door panel 1040 that forms a portion of a vehicle side surface is provided at an outward side of the rocker panel 1030 in the direction of vehicle width.

The door panel 1040 is substantially perpendicular to the floor panel 1010. An inward surface of a lower portion of the door panel 1040 which faces inward in the direction of vehicle width is in contact with the rocker panel 1030. A tunnel 1020, that is, a vehicle central frame member, is disposed at an inward side of the battery pack 2000 in the direction of vehicle width.

Figure 5:
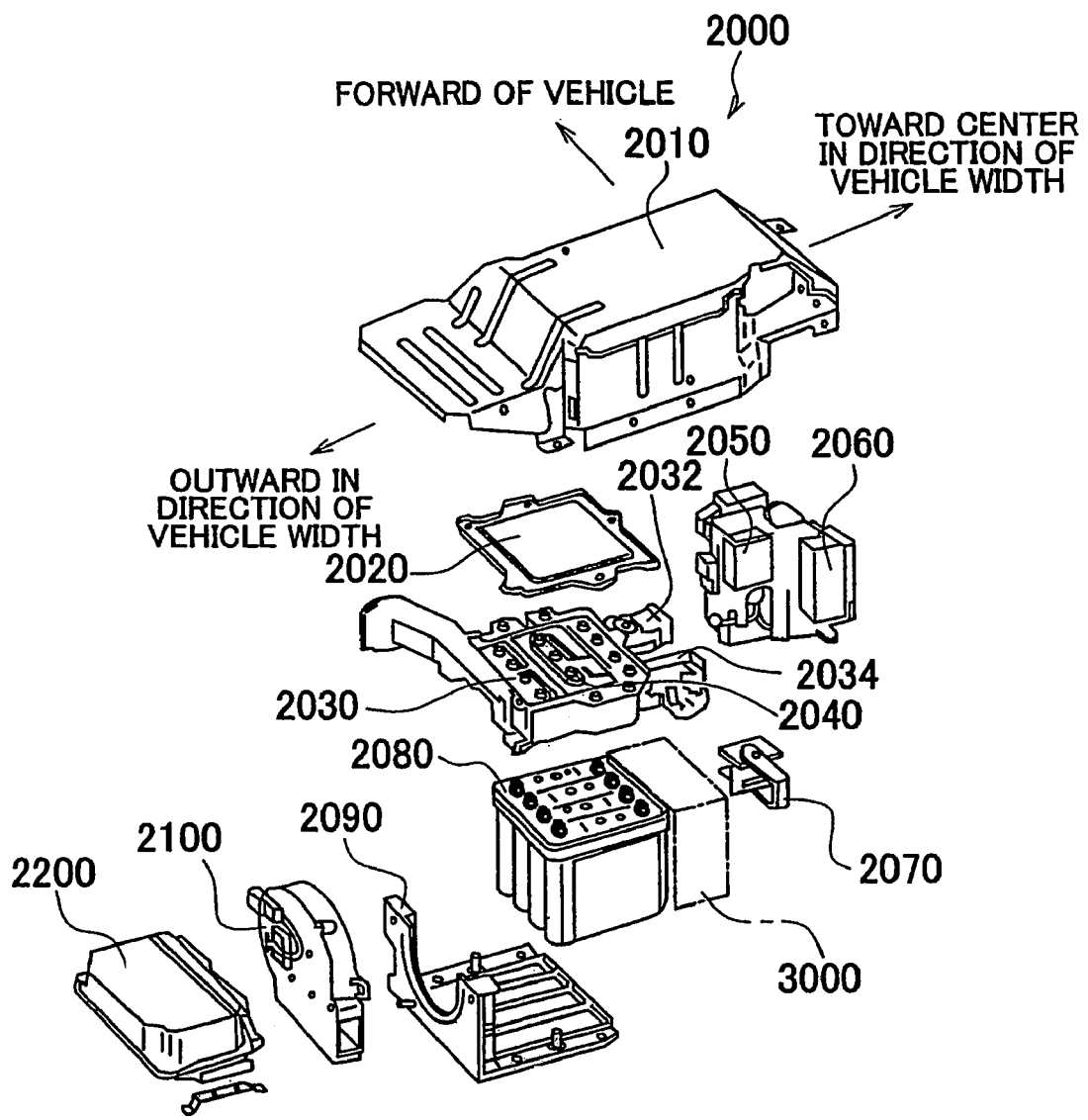
FIG. 5 is an exploded perspective view of a battery pack mounted in a vehicle via the mounting structure in accordance with the embodiment of the invention.

With reference to FIG. 5, the battery pack 2000 will be described in detail. The battery pack 2000 is formed by combining a lithium ion battery, a battery control computer, etc. The battery pack 2000 shown in FIG. 5 is disposed under the passenger seat 1120 as shown in FIGS. 1 to 4, in such a posture that a portion of the battery pack 2000 shown leftward in FIG. 5 is positioned at an outward side in the direction of vehicle width, and a portion of the battery pack 2000 shown rightward in FIG. 5 is positioned at a center side in the direction of vehicle width.

The aforementioned inward side in the direction of vehicle width and the aforementioned center side in the direction of vehicle width correspond to a "side that faces a center line of the vehicle width" in the invention. The aforementioned outward side in the direction of vehicle width corresponds to a "side opposite from the side that faces the center line of the vehicle width" in the invention.

As shown in FIG. 5, the battery pack 2000 is protected by a battery pack cover 2010 that prevents impact on the battery pack 2000 and blocks penetration of water or moisture. Disposed under the floor panel battery pack cover 2010 are a battery carrier panel 2020, a junction block assembly 2030, an electric current sensor 2050 and a battery relay 2060.

The junction block assembly 2030 is provided with a plus terminal 2032 and a minus terminal 2034 of the battery pack 2000. The minus terminal 2034 is ground-connected to the vehicle body. The plus terminal 2032 is connected to a main power cable of the vehicle 1000 via a bus bar 2036 shown in FIG. 6. The bus bar 2036 has a twisted plate structure.

The junction block assembly 2030 is provided with a battery temperature sensor 2040. The junction block assembly 2030 is further provided with a service plug 2070. The service plug 2070 is removed at the time of maintenance of the power supply to break the voltage on the grounded side of the battery pack 2000 and therefore secure safety during operation.

Battery cells 2080, that is, a lithium ion battery, are disposed under the junction block assembly 2030. As shown in FIG. 5 in the battery pack 2000, four battery cells 2080 each having a capacity of 12 Ah and a nominal voltage of 3.6 V are connected in series.

As shown in FIG. 5, the four battery cells 2080 are stacked in the longitudinal direction relative to the vehicle. The stacked battery cells 2080 are spaced from one another. The interval spaces between the battery cells 2080 function as cooling passageways for conducting a cooling medium (air). The four battery cells 2080 are mounted on a battery tray 2090.

A blower fan 2100 is disposed at an outward side of the battery cells 2080 in the direction of vehicle width. A battery control computer 2200 is disposed at an outward side of the blower fan 2100. The blower fan 2100 causes the cooling medium (air) to flow from the center side in the direction of vehicle width to the outward side in the direction of vehicle width. Therefore, the cooling medium (air) flows through the cooling passageways provided between the battery cells 2080, and reaches the blower fan 2100, and is then discharged via an outlet of the blower fan 2100 into a rear seat 1130-side portion of the cabin.

As shown in FIG. 5, a space portion 3000 is provided at a center side of the four battery cells 2080 that faces the center in the direction of vehicle width. The space portion 3000 has a capacity that allows the four battery cells 2080 to move to the center side in the direction of vehicle width. The area of a section of the space portion 3000 viewed in the direction of vehicle width is designed to be substantially equal to or greater than the sectional area of the battery cells 2080.

Figure 6:
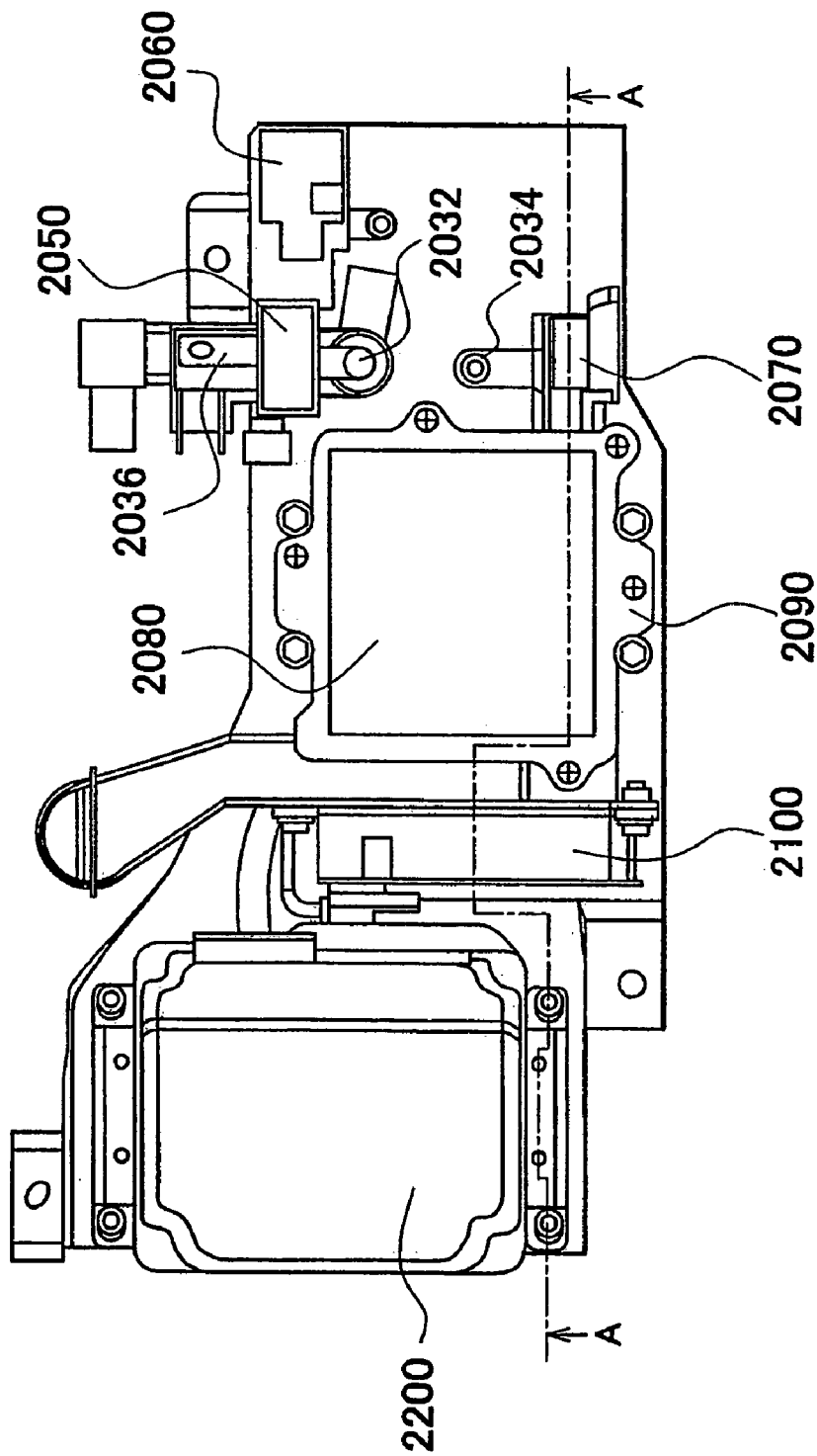
FIG. 6 is a top plan view of the battery pack mounted in a vehicle via the mounting structure in accordance with the embodiment of the invention.
Figure 7:
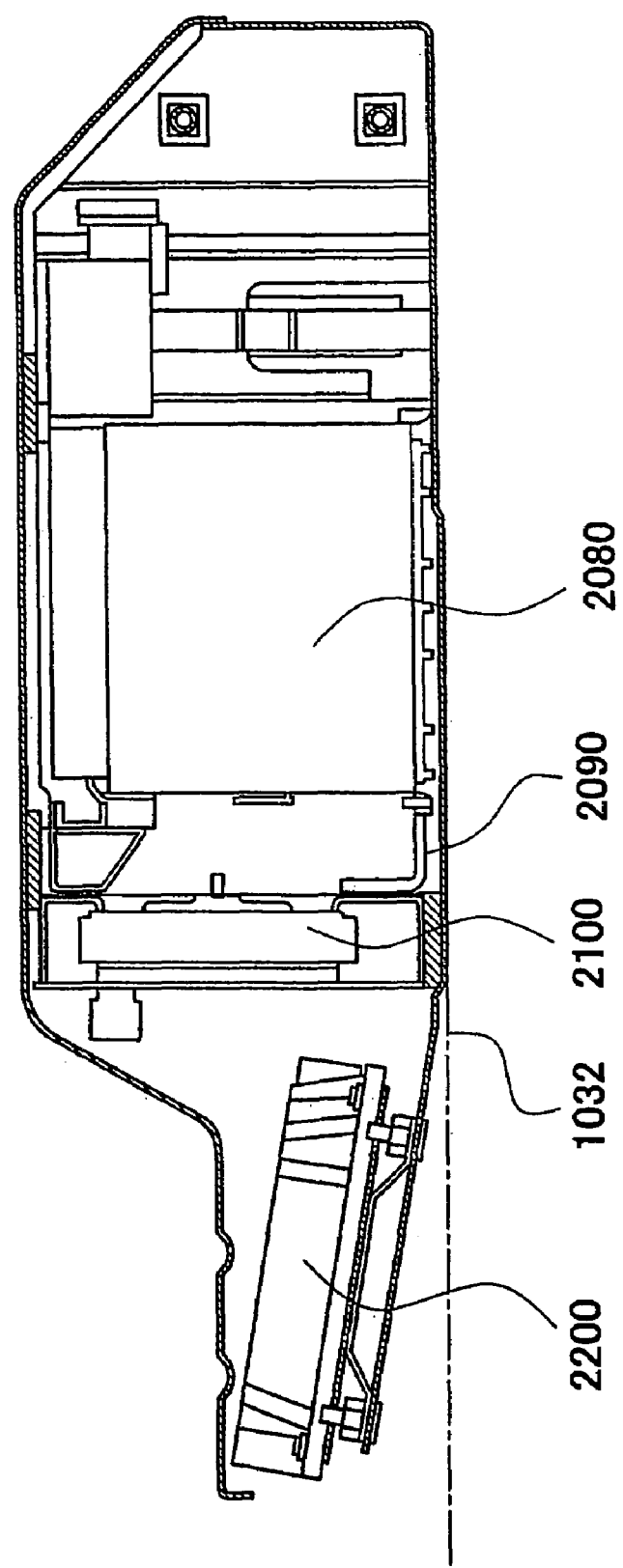
FIG. 7 is a side view of the battery pack mounted in a vehicle via the mounting structure in accordance with the embodiment of the invention.

With reference to FIGS. 6 and 7, the structure of the battery pack 2000 will be further described in detail.

FIG. 6 shows a top plan view of the battery pack 2000, from which the battery pack cover 2010 has been removed. FIG. 7 shows a sectional view taken on line A-A in FIG. 6.

As shown in FIGS. 6 and 7, the battery relay 2060, the electric current sensor 2050, the junction block assembly 2030, the four battery cells 2080, the blower fan 2100 and the battery control computer 2200 are disposed in the battery pack 2000 in that order from the side of the center in the direction of vehicle width to the side outward in the direction of vehicle width. The battery control computer 2200 is disposed in a tilted posture that is angled by a predetermined angle with respect to the substantially horizontal floor panel 1010.

The blower fan 2100 draws the cooling medium (air) from the center side in the direction of vehicle width so that the cooling medium (air) flows through the cooling passageways provided between the individual battery cells 2080. The drawn cooling medium is discharged to the rear seat 1130-side portion. The blower fan 2100 is a fan wherein the direction of suction of the cooling medium is along the rotation axis of the fan and the direction of discharge of the cooling medium is a circumferential direction relative to the fan, for example, a sirocco fan or the like. A sirocco fan is compact in size, and is able to generate great pressure. Therefore, the blower fan 2100 is able to efficiently move the cooling medium (air) even if a great pressure loss is caused by the flow of the cooling medium through passageways having a complicated configuration, such as the narrow cooling passageways provided between the individual battery cells 2080.

The space portion 3000 is provided at the center side of the battery cells 2080 in the direction of vehicle width. The space portion 3000 serves as a chamber for introduction of the cooling medium (air) into the cooling passageways provided between the individual battery cells 2080 via the blower fan 2100. Serving as a chamber, the space portion 3000 allows uniform introduction of the cooling medium (air) into the cooling passageways provided between the individual battery cells 2080.

The air outlet of the blower fan 2100 for the cooling medium (air) is not directly exposed to the space that forms the cabin. The outlet of the blower fan 2100 is covered with the battery pack cover 2010. The battery pack cover 2010 has a plurality of divided outlet openings for the cooling medium (air). Therefore, the cooling medium (air) discharged from the blower fan 2100 does not directly strike an occupant in the rear seat 1130, but diffuses in the cabin of the vehicle 1000.

With regard to a vehicle incorporating a vehicular battery mounting structure in accordance with the foregoing embodiment of the invention, the state occurring at the time of a side impact collision on the passenger seat side will be described.

If a vehicle 1000 equipped with the battery pack 2000 has a sideway impact collision, and therefore receives an impact in a direction from the door panel 1040 toward the battery pack 2000, the rocker panel 1030 collides with a lower surface of the battery control computer 2200. The lower surface of the battery control computer 2200 serves as a collision surface that collides with a vehicle body that is translationally moved inward at the time of a collision. Then, the battery control computer 2200 is turned clockwise in the side view of FIG. 7 about an end portion 1032 of the mounting plate for fixing the battery control computer 2200.

That is, in the case of a vehicle collision in a direction from the door panel 1040 toward the battery pack 2000, the battery control computer 2200 disposed between the door panel 1040 and the battery pack 2000 is in the posture inclined with respect to the direction of collision, and is therefore turned by the rocker panel 1030 colliding therewith. Therefore, at least a portion of the energy of collision is consumed as an energy for turning the battery control computer 2200. As a result, the transfer of collision energy to the battery pack 2000 is less likely.

Furthermore, description will be made in conjunction with a case where the impact of a side collision is great, and therefore propagates to the battery cells 2080. If a side collision impact propagates to the battery cells 2080, the battery cells 2080 are translationally moved toward the space portion 3000 provided at a center side of the battery cells 2080 that faces the center in the direction of vehicle width. The provision of the space portion 3000 allows the battery cells 2080 to move toward the center side in the direction of vehicle width without being crushed. As a result, the possibility of breakage of a battery cell 2080 reduces.

The plus terminal 2032 and the minus terminal 2034 provided in the junction block assembly 2030 of the battery pack 2000 face the center side in the direction of vehicle width. A distal end (load side) of the plus terminal 2032 of the battery pack 2000 is provided with a fuse and a battery relay 2060.

If a short circuit occurs at a distal end side (load side) of the plus terminal 2032 of the junction block assembly 2030, the fuse and the battery relay 2060 will immediately break the circuit connected to the battery pack 2000. However, if the plus terminal 2032 forms a short circuit with the minus terminal 2034 or the vehicle body, which is ground-connected with the minus terminal 2034, the battery circuit becomes short-circuited, and therefore self-discharge occurs. The self-discharge sometimes involves a spark and, in the worst case, causes a fire.

However, as indicated in FIGS. 5 and 7, the plus terminal 2032 and the minus terminal 2034 in the junction block assembly 2030 are disposed so as to face the center side in the direction of vehicle width. That is, the two terminals 2032, 2034 are located at a vehicle center side where reception of impact at the time of a collision is least likely. This arrangement will prevent the plus terminal 2032 from contacting and therefore short-circuiting with the vehicle body or the like in the event of a side collision of the vehicle.

According to the battery pack mounting structure in accordance with the embodiment, a battery pack is disposed in a space that is above the floor panel and below a rear seat or a passenger seat without the steering wheel being disposed forward thereof. The passenger or rear seat can be moved more easily than the driver seat and therefore allows easy maintenance of the battery pack. Furthermore, the passenger and rear seats are less often equipped with a power seat function. Therefore, due to a correspondingly smaller number of electrical equipment component parts provided under such a seat, the provision of the battery pack mounting structure under the seat improves the ease of mounting a battery pack.

Furthermore, according to the battery pack mounting structure in accordance with the embodiment, the terminal portions of the battery pack face the center side in the direction of vehicle width. Therefore, in the event of a side collision of the vehicle, the possibility of the plus terminal and the minus terminal forming a short circuit is very low. Furthermore, the space portion having a sectional area that is substantially equal to or greater than a sectional area of the battery cells is provided at the center side of the battery cells that faces the center in the direction of vehicle width. If impact propagates to the battery cells in the event of a vehicle side collision, the battery cells move into the space portion. Therefore, the possibility of breakage of the battery cells reduces.

Still further, according to the battery pack mounting structure in the embodiment, the battery cells are stacked in the longitudinal direction relative to the vehicle. The cooling passageways of the cooling medium (air) are provided between the individual battery cells stacked as described above. The cooling passageways are formed so that the cooling medium (air) flows from the center side in the direction of vehicle width to the outward side in the direction of vehicle width, and is discharged into the cabin. Thus, it becomes unnecessary to provide a chamber in an upper or lower portion of the battery pack. Therefore, it becomes possible to reduce the height of the battery. The aforementioned space portion, provided at the center side of the battery cells that faces the center in the direction of vehicle width, serves as a chamber for introduction of the cooling medium (air) performed by the blower, and therefore allows uniform distribution of the cooling medium (air) into the cooling passages.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A vehicular battery mounting structure comprising:
   a floor panel;
   a seat disposed above the floor panel, the seat having a back portion and a bottom portion; and
   a battery pack having a plurality of battery unit cells or battery modules in accordance with a performance of a vehicle, the battery pack being disposed between the floor panel and the bottom portion of the seat, the plurality of battery unit cells or battery modules being arranged side-by-side in a longitudinal direction relative to the vehicle, the battery pack further comprising a cooling fan that supplies a cooling medium in a direction of the vehicle width,
   wherein the battery pack comprises a battery body formed by the plurality of battery unit cells or battery modules, and a space portion, through which the cooling medium is introduced, that is arranged within the battery pack and adjacent to the battery body, that is provided at a side of the battery body that faces a center line of a width of the vehicle, wherein the cooling fan is provided at a side of the battery body opposite from the side that faces the center line of the width of the vehicle, wherein the cooling fan supplies the cooling medium between the battery unit cells, or between the battery modules, wherein the cooling fan supplies the cooling medium through the battery body from the side that faces the center line of the width of the vehicle to the side opposite from the side that faces the center line of the width of the vehicle, and discharges the cooling medium into a cabin, wherein the battery pack further comprises a diffusion portion for diffusing the cooling medium discharged from the cooling fan into the cabin, and wherein the diffusion portion includes a plurality of outlets.

2. The vehicular battery mounting structure according to claim 1, wherein the seat is a seat that does not have a power seat function.

3. The vehicular battery mounting structure according to claim 1, wherein the seat is a passenger seat or a rear seat.

4. The vehicular battery mounting structure according to claim 1, wherein a suction direction of the cooling fan is a direction of a rotating axis of the cooling fan, and a discharge direction of the cooling fan is a circumferential direction relative to the cooling fan.

5. The vehicular battery mounting structure according to claim 1, wherein the cooling fan is a sirocco fan.

6. The vehicular battery mounting structure according to claim 1, wherein the battery pack is formed by a lithium ion battery or a nickel metal hydride battery.

7. The vehicular battery mounting structure according to claim 1, wherein the battery pack is disposed between a vehicle side frame member and a vehicle central frame member, the battery pack, the vehicle side frame member, and the vehicle central frame member being separated from each other.

* * * * *